US012768592B2

(12) United States Patent
Zhang et al.

(10) Patent No.: US 12,768,592 B2
(45) Date of Patent: Oct. 20, 2026

(54) METHODS AND APPARATUS FOR DRYING CANNABIS

(71) Applicant: EnWave Corporation, Delta (CA)

(72) Inventors: Guopeng Zhang, Delta (CA); Shafique Ahmad, Delta (CA); Mehmet Sucu, Delta (CA)

(73) Assignee: EnWave Corporation, Delta, CA (US)

( * ) Notice: Subject to any disclaimer, the term of this patent is extended or adjusted under 35 U.S.C. 154(b) by 447 days.

(21) Appl. No.: 18/570,749

(22) PCT Filed: Aug. 25, 2021

(86) PCT No.: PCT/CA2021/051180
§ 371 (c)(1),
(2) Date: Dec. 15, 2023

(87) PCT Pub. No.: WO2023/019343
PCT Pub. Date: Feb. 23, 2023

(65) Prior Publication Data

US 2024/0280318 A1 Aug. 22, 2024

Related U.S. Application Data

(60) Provisional application No. 63/234,074, filed on Aug. 17, 2021.

(51) Int. Cl.
*F26B 3/347* (2006.01)
*F26B 5/04* (2006.01)
(Continued)

(52) U.S. Cl.
CPC .............. *F26B 3/347* (2013.01); *F26B 5/042* (2013.01); *F26B 15/14* (2013.01); *F26B 21/35* (2026.01);
(Continued)

(58) Field of Classification Search
CPC .......... F26B 3/347; F26B 5/042; F26B 15/14; F26B 21/35; F26B 25/001; F26B 25/008;
(Continued)

(56) References Cited

U.S. PATENT DOCUMENTS 3,277,580 A 10/1966 Tooby
5,020,237 A 6/1991 Gross et al.
(Continued)

FOREIGN PATENT DOCUMENTS

CA 1223496 A 6/1987
CA 3070605 C 3/2019
(Continued)

*Primary Examiner* — David J Laux
(74) *Attorney, Agent, or Firm* — McKee, Voorhees & Sease, PLC

(57) ABSTRACT

Methods for drying *cannabis* in continuous throughput-type and batch-type microwave vacuum drying apparatus. One method uses a vacuum chamber having a plurality of adjacent drying zones. The *cannabis* is conveyed through each of the zones while exposing it to microwave radiation. Each of the drying zones has a microwave power level different from that of an adjacent drying zone, the microwave power levels of zones varying from each other in a non-linear arrangement from the first zone to the last zone. In a batch method, *cannabis* is loaded into a vacuum chamber, the pressure is reduced, and the *cannabis* is irradiated with microwave radiation at a first power level. The surface temperature of the *cannabis* is measured and when the temperature exceeds a specified temperature for a time period greater than a first time period, the power level is reduced to a lower power level for a second time period. The methods of drying maximize the retention of terpenes in the *cannabis*.

22 Claims, 4 Drawing Sheets

(51) Int. Cl.

| | |
|---|---|
| ***F26B 15/14*** | (2006.01) |
| ***F26B 21/35*** | (2026.01) |
| ***F26B 25/00*** | (2006.01) |

(52) U.S. Cl.
CPC .......... *F26B 25/001* (2013.01); *F26B 25/008* (2013.01); *F26B 2200/02* (2013.01)

(58) Field of Classification Search
CPC ...... F26B 2200/02; F26B 5/048; F26B 21/30; A61K 2236/17; A61K 36/3482; A23B 2/103; A23B 2/97; A23B 7/02
See application file for complete search history.

(56) References Cited

U.S. PATENT DOCUMENTS

| | | | | |
|---|---|---|---|---|
| 6,539,645 | B2 | 4/2003 | Savarese | |
| 2008/0184587 | A1* | 8/2008 | Shivvers | F26B 17/20 34/135 |
| 2010/0218395 | A1* | 9/2010 | Durance | A23B 2/08 34/406 |
| 2011/0027868 | A1* | 2/2011 | Durance | A61K 39/0275 435/307.1 |
| 2012/0291305 | A1* | 11/2012 | Fu | A23B 2/08 34/263 |
| 2014/0328867 | A1* | 11/2014 | Fu | A23B 2/97 34/259 |
| 2015/0096189 | A1 | 4/2015 | Hawes et al. | |
| 2015/0128442 | A1* | 5/2015 | Durance | A23B 2/97 34/259 |
| 2017/0115057 | A1* | 4/2017 | Durance | F26B 5/04 |
| 2018/0221522 | A1* | 8/2018 | Eades | A23B 2/08 |
| 2018/0325149 | A1* | 11/2018 | Durance | A23B 75/00 |
| 2019/0343136 | A1* | 11/2019 | Durance | A23B 2/92 |
| 2020/0009109 | A1 | 1/2020 | Macaluso et al. | |
| 2020/0178572 | A1 | 6/2020 | Docherty et al. | |
| 2020/0246495 | A1* | 8/2020 | Durance | A23B 2/08 |
| 2021/0212347 | A1* | 7/2021 | Zhang | A23B 2/08 |

FOREIGN PATENT DOCUMENTS

| | | | |
|---|---|---|---|
| CN | 102524903 | B | 7/2013 |
| WO | 2020223784 | A1 | 11/2020 |
| WO | 2021040753 | A1 | 3/2021 |

* cited by examiner

METHODS AND APPARATUS FOR DRYING CANNABIS

CROSS REFERENCE TO RELATED APPLICATIONS

This is a U.S. National Phase application claiming priority to PCT/CA2021/051180, filed Aug. 25, 2021, which claims priority to Provisional Application U.S. Ser. No. 63/234,074, filed Aug. 17, 2021, the entire contents of which are hereby expressly incorporated by reference in their entirety including, without limitation, the specification, claims, and abstract, as well as any figures, tables, or drawings thereof.

FIELD OF THE INVENTION

The invention pertains to methods of drying *cannabis* using microwave vacuum drying.

BACKGROUND OF THE INVENTION

Terpenes are naturally occurring, volatile organic compounds present in *cannabis* and many other plants. The beneficial properties of some essential oils are derived from terpenes. In *cannabis*, terpenes are responsible for the particular odour and flavour of the different *cannabis* strains. Different terpenes are present in varying amounts in the various *cannabis* strains. *Cannabis* strains have particular terpene profile expressions that are important to consumers, and no two strains have the same terpene profile.

Terpenes begin to evaporate at just above room temperature. Conventional *cannabis* drying methods do not usually cause substantial degradation of cannabinoids, which are quite stable and non-volatile. However, terpenes are volatile and there is significant loss when *cannabis* is dried by conventional methods. Maximizing terpene retention is recognized in the industry as being important in the production of premium quality *cannabis* products.

The most common method used to dry *cannabis* is a slow room drying process which is generally referred to as "hang drying" or "rack drying." In these methods, *cannabis* branches are either hung up or placed on racks. In another conventional method, the trimmed flowers are placed in trays in a single layer and the trays are put onto racks in a drying room. In general, these conventional drying methods can take from about five to fifteen days, depending on the size of the branches and buds, and the surrounding environment. Lengthy *cannabis* drying results in the loss of lighter terpenes. Monoterpenes are the most volatile as they have the lowest evaporation points and dissipate first during drying, even before water.

WO 2019/041017 (EnWave Corporation) discloses drying *cannabis* using a microwave vacuum drying apparatus that both pasteurizes and dries the *cannabis* in a single operation. However, pasteurization requires relatively high temperatures and a sufficient time of exposure to microwave radiation, so the method is not suitable where the goal is preserve terpenes to the greatest extent possible.

It would be desirable to provide a process the drying *cannabis* while maximizing the retention of terpenes, especially the more volatile monoterpenes and sesquiterpenes, producing a dried product that retains more terpenes than using the prior art methods.

SUMMARY OF THE INVENTION

According to one aspect of the invention there is provided a continuous throughput method of drying *cannabis* in a vacuum chamber having a plurality of adjacent drying zones, the vacuum chamber being at a pressure less than atmospheric, comprising: (a) loading the *cannabis* into the vacuum chamber; (b) conveying the *cannabis* from an input end of the vacuum chamber to an output end through each of the drying zones between the input end and the output end while exposing the *cannabis* to microwave radiation; (i) each of the drying zones having a microwave power level different from the microwave power level of an immediately adjacent drying zone, (ii) the microwave power levels of respective drying zones varying from each other in a non-linear arrangement from a first said drying zone to a last said drying zone; and (c) unloading the dried *cannabis* from the vacuum chamber.

According to a further aspect of the invention there is provided a continuous throughput method of drying *cannabis* in a vacuum chamber having a plurality of adjacent drying zones, the drying zones comprising a first drying zone adjacent to an input end of the vacuum chamber, a last drying zone adjacent to an output end of the vacuum chamber, and one or more drying zones between the first drying zone and the last drying zone, comprising: (a) activating microwave generators having a microwave power level in each of the drying zones such that the microwave power level in each drying zone between the first drying zone and the last drying zone is either (i) lower than both immediately adjacent drying zones or (ii) higher than both immediately adjacent drying zones; (b) reducing the pressure in the vacuum chamber to a pressure below atmospheric; (c) loading the *cannabis* into the vacuum chamber; (d) conveying the *cannabis* from the input end to the output end through each of the drying zones while exposing the *cannabis* to microwave radiation at the power level of each respective drying zone; and (e) unloading the dried *cannabis* from the vacuum chamber.

According to a further aspect of the invention there is provided a batch method of drying *cannabis*, comprising: (a) loading *cannabis* into a vacuum chamber; (b) reducing the pressure in the vacuum chamber to a pressure below atmospheric; (c) radiating the *cannabis* with microwave radiation at a first power level; (d) measuring the surface temperature of the *cannabis* being irradiated in step (c) and, when the measured temperature exceeds a specified temperature for a time period greater than a first time period, reducing the microwave power level to a lower power level that is a specified ratio of the first power level for a second time period; (e) repeating steps (c) and (d) a plurality of times; and (f) unloading the dried *cannabis* from the vacuum chamber.

According to a further aspect of the invention there is provided an apparatus for dehydrating *cannabis*, comprising: (a) a vacuum chamber having a plurality of adjacent drying zones, the drying zones comprising a first drying zone adjacent to an input end of the vacuum chamber, a last drying zone adjacent to an output end of the vacuum chamber, and one or more drying zones between the first drying zone and the last drying zone; (b) means for loading the *cannabis* into the vacuum chamber at the input end; (c) means for unloading the *cannabis* from the vacuum chamber at the output end; (d) means for conveying the *cannabis* from the input end through the plurality of drying zones to the output end; and (e) microwave generators having a microwave power level in each of the drying zones such that the microwave power level of each drying zone between the first drying zone and the last drying zone is either (i) lower than in both immediately adjacent drying zones or (ii) higher than in both immediately adjacent drying zones.

Further aspects of the invention and features of specific embodiments of the invention are described below.

DETAILED DESCRIPTION

The invention provides methods for drying *cannabis* in both continuous throughput-type and batch-type microwave vacuum drying apparatus, while maximizing the retention of terpenes.

Continuous Throughput Drying

For drying in a continuous throughput process, a microwave vacuum chamber is provided having a plurality of drying zones, each of which has its microwave power set at a selected power level. The power levels are set in an alternating arrangement such that, as the *cannabis* is moved through the vacuum chamber, its maximum temperature is maintained at a target temperature that is optimal for drying the *cannabis* while maximizing terpene retention.

Figure 1:
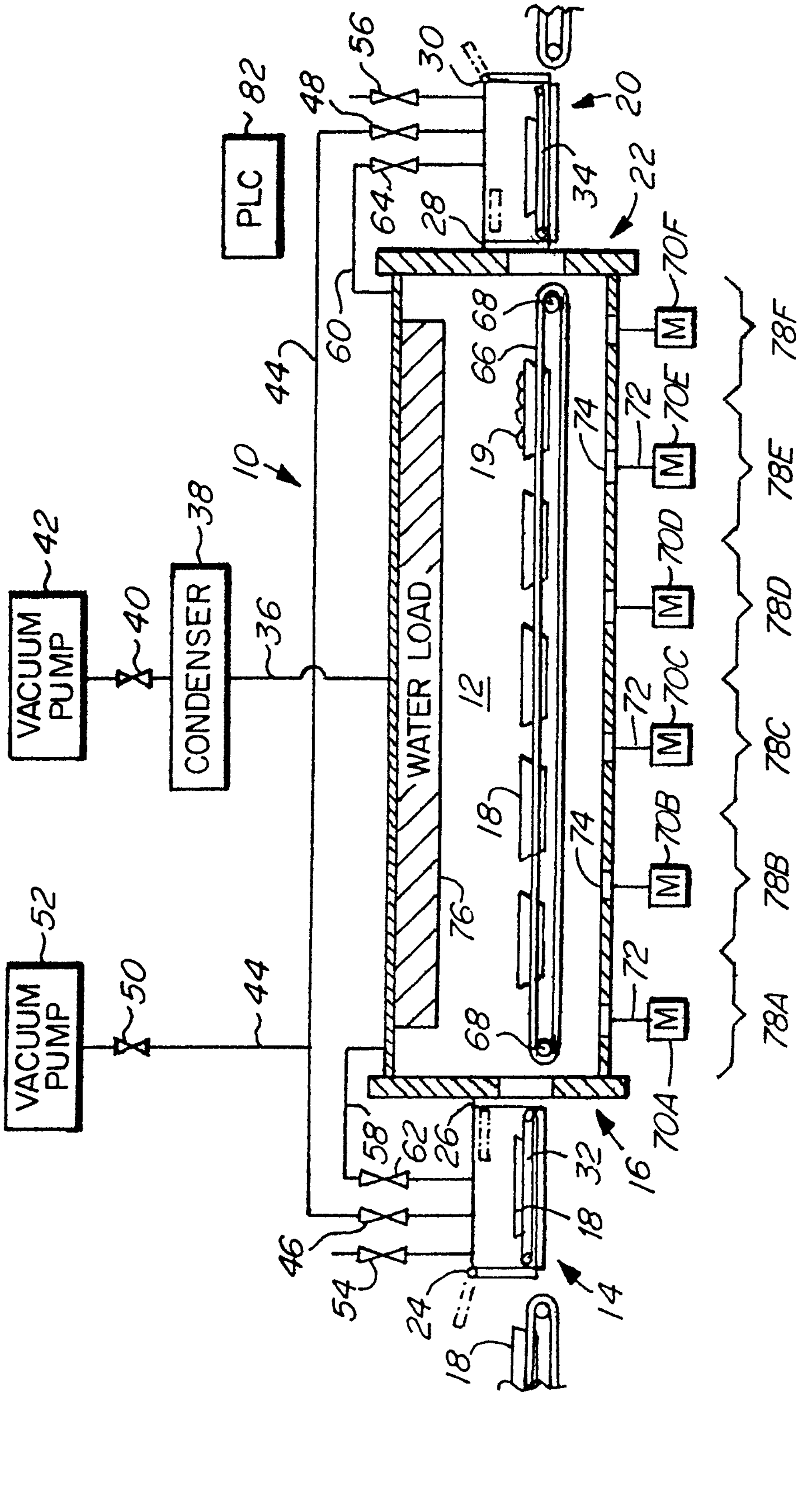
FIG. 1 is a schematic drawing of a continuous throughput microwave vacuum apparatus for carrying out one embodiment of the method of the invention.

FIG. 1 schematically illustrates an embodiment of the continuous throughput microwave vacuum drying apparatus 10. It has a vacuum chamber 12 through which a tray of *cannabis* is conveyed for dehydration. A loading module 14 is positioned at the input end 16 of the vacuum chamber for introduction of trays 18 of *cannabis* material 19 into the vacuum chamber 12. A discharge module 20 is positioned at the output or discharge end 22 of the vacuum chamber for removal of the trays of *cannabis*. The loading module 14 and discharge module 20 each have a pair of airlock doors, respectively 24, 26 and 28, 30 (their open position being shown by dotted lines in FIG. 1). These permit the trays to be loaded into and unloaded from the vacuum chamber, while maintaining the vacuum chamber at the reduced pressure required for the dehydration process. The loading and discharge modules 14, 20 have motor-driven conveyors 32, 34, respectively, for moving the trays.

The vacuum chamber 12 is connected via a vacuum pipe 36, a condenser 38 and a shut-off valve 40 to a vacuum pump 42 or the vacuum system of a plant. The loading and discharge modules 14, 20 are connected via a vacuum pipe 44 and shut-off valves 46, 48 and 50 to a vacuum pump 52. The loading and discharge modules are vented by discharge shut-off valves 54 and 56 respectively. A further discharge valve (not shown) is provided for venting the vacuum chamber. The loading and discharge modules 14, 20 are connected to the vacuum chamber 12 for pressure equalization by means of equalization conduits 58 and 60 and the associated shut-off valves 62 and 64, respectively.

The vacuum chamber 12 has a motor-driven conveyor 66 extending longitudinally through it and arranged to support and convey the trays 18. The conveyor runs on rollers 68 adjacent to the inlet and the outlet ends of the vacuum chamber.

Microwave generators or groups of microwave generators 70A to 70F are mounted below the vacuum chamber 12 and are arranged to radiate microwave energy into the vacuum chamber through waveguides 72 and microwave-transparent windows 74. Each microwave generator group 70 comprises one or more microwave generators, for example six or eight microwave generators.

The microwave generators are connected to a conventional power source (not shown) which provides the required electric power. The microwave generators are cooled by coolant pumped to circulate around them from a cooling liquid refrigeration unit. A water load 76 is provided at the upper part of the vacuum chamber 12 to absorb microwave energy and thus prevent reflection of microwaves in the vacuum chamber. The water is pumped through tubing by a water load pump.

The vacuum chamber 12 has six drying zones 78A, 78B, 78C, 78D, 78E and 78F, each of which has a respective group of microwave generators 70A to 70F. The first drying zone 78A is adjacent to the input end 16 of the vacuum chamber, the last drying zone 78F is adjacent to the output end 22, and the other four drying zones are arranged adjacent to each other between the first and last drying zones. In other embodiments, the vacuum chamber may comprise more or fewer than six drying zones, for example one drying zone or four drying zones or 12 drying zones. In the illustrated embodiment each of the six drying zones extends approximately one-sixth of the length of the vacuum chamber. For example, in a vacuum chamber that is 4.2 meters in length, each of the drying zones is about 0.7 meters long.

The vacuum chamber zone 12 is not partitioned into separate pressure zones and accordingly the six drying zones 78A to 78F are at the same vacuum pressure. The distinction between the zones is the level of microwave power that is applied in each zone. This may be accomplished, for example, by the number of microwave generators or generator groups 70 in each drying zone, or by means of higher power microwave generators in a given zone, or by setting the microwave generators at a particular power level in a given zone. In the illustrated embodiment, each microwave generator group may have a power output in the range of 0.2 to 10 kW.

The dehydration apparatus 10 includes a programmable logic controller (PLC) 82, programmed and connected to control the operation of the system, including the pressure and temperature sensors, the conveyor drive motors, the airlock doors, the microwave generators, the water load pump, the vacuum pumps, the condenser, the refrigerant pump and the vacuum shut-off valves.

It will be understood that the invention applies to microwave vacuum dehydrators having any of various means for feeding, conveying and discharging the *cannabis* material. In one embodiment, as illustrated, the *cannabis* is transported in trays which ride on a conveyor belt, with feeding into and discharge from the vacuum chamber being done by means of loading and discharge modules having airlock doors. In another embodiment, the *cannabis* material is fed into and out of the vacuum chamber by means of rotary vacuum valves rather than airlocks with doors, and is transported directly on the conveyor belt rather than on trays. In yet another embodiment, the material is transported through the vacuum chamber in a rotating basket, an arrangement of the type disclosed in WO 2009/049409 to EnWave Corporation. The present invention is independent of any particular means for moving the *cannabis* material into, through and out of the vacuum chamber.

The basic steps of the method of drying are as follows. The vacuum pressure is set to the desired pressure, for example, a pressure in the range of about 10 to 50 Torr (13 to 67 mbar), alternatively about 20 to 30 Torr (27 to 40 mbar), alternatively about 25 Torr (33 mbar). The microwave generators are activated at the power levels selected for each of the drying zones. The *cannabis* material is loaded into the vacuum chamber. This is done on a continuous throughput basis and the material is conveyed at constant speed through each of the drying zones in the vacuum chamber. It is irradiated with microwave energy in each drying zone at the microwave power level of the respective drying zone. After the last drying zone, the dried *cannabis* is unloaded from the vacuum chamber.

The method of the invention may be carried out using the dehydration apparatus 10. The airlock doors 26 and 30 are closed and the vacuum pumps, water load pump, conveyor drive motors and microwave generators are actuated, all under the control of the PLC 82. Pressure within the vacuum chamber is reduced to the desired vacuum pressure for drying. The *cannabis* 19 to be dehydrated is put into a tray 18 and the tray is placed in the loading module 14. The outer airlock door 24 and shut-off valve 52 are closed and the loading module is evacuated by the vacuum pump 45 to the pressure of the vacuum chamber. The inner airlock door 26 is then opened and the tray is transported, by the conveyors 32 and 66, into the vacuum chamber 12. Once the tray is fully inside the vacuum chamber, the loading chamber 14 is prepared for receiving a second tray, by closing the inner airlock door 26 and the shut-off valves 46 and 62, opening the shut-off valve 54 to vent the loading module to atmospheric pressure, and opening the outer airlock door 24. The dehydration apparatus is thus able to process multiple trays of *cannabis* material at the same time, in a continuous process. Inside the vacuum chamber 12, the tray is moved along the conveyor 66 through each of the drying zones 78A to 78F and the microwave generator groups 70A to 70F irradiate the *cannabis* and dehydrate it. Moisture given off by the *cannabis* is conveyed to the condenser 40 to be condensed to liquid water. The residence time in the vacuum chamber, as the *cannabis* is moved at constant speed from the input end to the discharge end, is about 70 minutes, alternatively in the range of 50 to 90 minutes, alternatively in the range of 80 to 150 minutes. The length of each drying zone 78A to 78E is approximately equal in this embodiment, and as the conveyor 66 moves the *cannabis* at a constant speed, the residence time in each drying zone is the same. The target maximum temperature of the *cannabis* during treatment is about 40° C., or alternatively about 39° C., or in the range of 30 to 45° C. The *cannabis* is dried to a desired moisture content, for example in the range of 1 to 16 wt. %, alternatively in the range of 2 to 14 wt. %. The drying process retains a high proportion of the terpenes in the *cannabis*, for example at least 75 wt. %, or at least 80 wt. %, or at least 89 wt. %.

At the end of the residence time within the vacuum chamber, the tray 18 of *cannabis* enters the discharge module 20, where it is conveyed toward the outer airlock door 30. The inner airlock door 28 is then closed, the shut-off valves 48, 64 are closed, the valve 56 is opened to vent the discharge module to the atmosphere, the outer airlock door 30 is opened and the tray is removed. The discharge module is prepared for the next tray of fresh *cannabis* to be removed from the vacuum chamber by closing the outer airlock door 30, evacuating the discharge module by means of vacuum pump 52 to the reduced pressure of the vacuum chamber, and opening the inner airlock door 28. Following either loading or discharge of a tray from the loading module or discharge module, the vacuum pump 52 draws gases from the loading or discharge module, through the vacuum conduit 64, without disturbing the vacuum in the vacuum chamber 12.

The microwave power levels of the drying zones are set so that as a tray of *cannabis* is conveyed, at constant speed, through the vacuum chamber from the input end to the output end, it is exposed to alternating higher and lower microwave power levels. This maintains the maximum temperature of the *cannabis* within a narrow range about the target temperature. For example, in the embodiment of FIG. 1, having six drying zones, the power levels may be set at about 8.0-10 kW in the first drying zone 78A, 4.0-5.0 kW in the second drying zone 78B, 5.5-7.5 kW in the third drying zone 78C, 1.6-3.0 kW in the fourth drying zone 78D, 3.0-5.0 kW in the fifth drying zone 78E, and 0-3.0 kW in the sixth (last) drying zone 78F. The power settings are such that, for each drying zone between the first drying zone 78A and the last drying zone 78F, the power level is either lower than the power level of the two immediately adjacent drying zones, or higher than the power level of the two immediately adjacent drying zones. Thus, the microwave power levels do not ascend or descend in a linear manner, i.e., they do not simply increase or decrease from the first drying zone to the last drying zone. Rather, the power levels of adjacent drying zones alternate between relatively higher and relatively lower power levels. The alternating cooling of the product in a lower power level drying zone and heating of the product in a higher power level drying zone (all within the desired range about the target temperature) dries the product efficiently. Power levels and residence times may be set having regard to the weight of *cannabis* being dried.

Batch Drying

Figure 4:
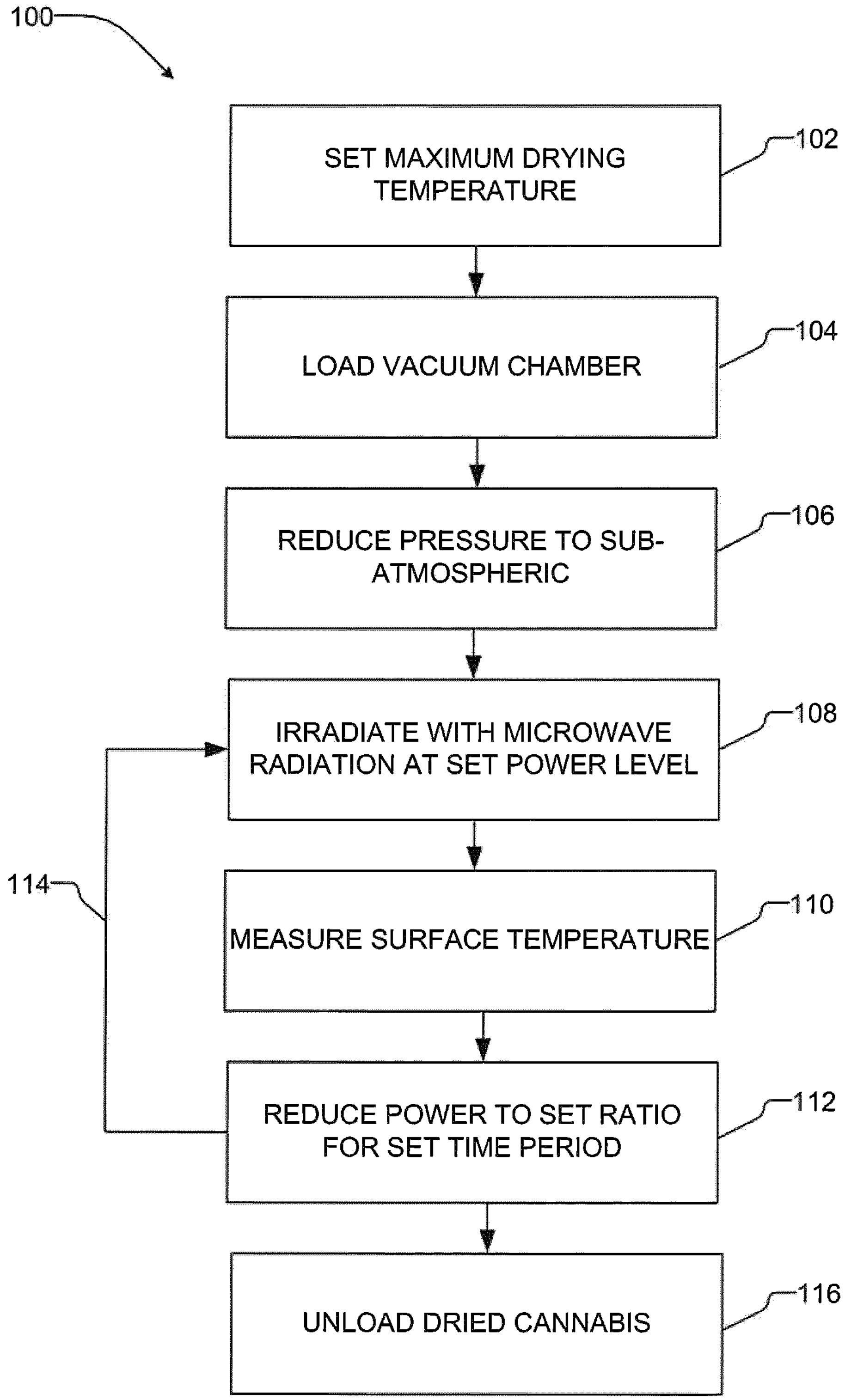
FIG. 4 is a flowchart of a method for batch drying of *cannabis* according to another embodiment of the invention.

The invention further provides a method of batch drying of *cannabis* that maximizes terpene retention. In this embodiment, fresh *cannabis* is dried in a batch-type microwave vacuum dryer, for example a resonance cavity microwave vacuum dryer. This drying method 100 is depicted in the flowchart of FIG. 4. The maximum surface temperature at which the *cannabis* is to be dried is set 102 at a selected temperature, for example 40° C., or a temperature in the range of 30-45° C. This temperature is selected to be sufficient low to minimize the loss of terpenes during drying while still being high enough to dry the *cannabis* within an acceptably short time period. This target temperature corresponds to a set power level. Fresh *cannabis* is loaded 104 into the microwave vacuum dryer. The pressure is reduced 106 to a pressure less than atmospheric, for example a pressure in the range of 10-50 Torr (13-67 mbar), alternatively about 20-30 Torr (27-40 mbar), alternatively about 25 Torr (33 mbar). The *cannabis* is irradiated 108 with microwave radiation at a set power level. The surface temperature of the *cannabis* is measured 110. When a temperature sensor reads a temperature value that is higher than the selected temperature for a specified time period, the microwave power level is reduced 112 to a specified ratio of the original power level, and to stay at that reduced power level for a specified time period before returning to the original level.

This control of the microwave power level may be done automatically by means of programming of a PLC that operates the drying apparatus. The specified time for the temperature to be higher than the selected temperature may, for example, be in the range of 1 and 60 seconds; the specified ratio of the reduced microwave power level to the original power level may be in the range of 5 and 95%; the specified time period for the power level to be reduced before returning to the original power level may be in the range of 5 to 600 seconds. Steps 108, 110 and 112 are then repeated 114. In a typical process, these three steps are repeated many times during the drying period, which may be, for example, in the range of 70-150 minutes. In this manner, the selected maximum surface temperature of the *cannabis* is maintained during the drying process. When the *cannabis* has been dried to the desired extent, the dried *cannabis* is unloaded 116 from the microwave vacuum chamber.

In some embodiments of the batch drying process, the total energy applied during the process is allocated to different power levels. For example, the drying may be done at two or more descending power levels, such as two or more of power levels 6.0 kW, 4.5 kW, 3 kW, 2 kW and 1.5 kW.

EXAMPLES

Example 1—Continuous Throughput Drying

Figure 2:
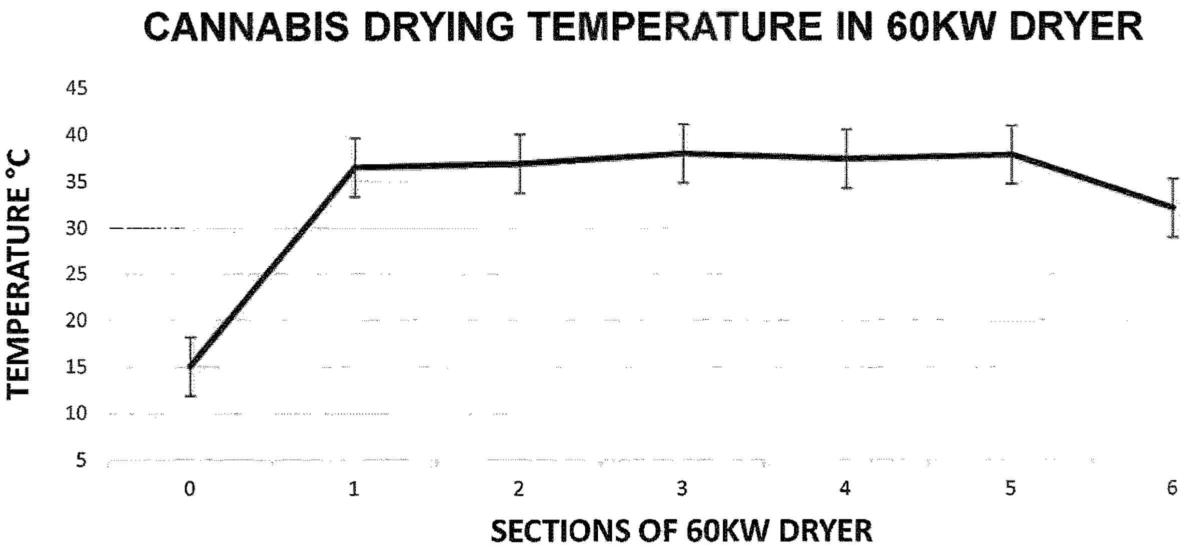
FIG. 2 is a graph showing the surface temperature of *cannabis* flowers during the continuous throughput drying process of Example 1.

Freshly trimmed *cannabis* flowers of the "LA Confidential" strain were loaded in multilayer fashion in polyethylene drying trays, with a loading depth of about 2.5 inches. The total product weight for each tray was 5.0 kg. The microwave vacuum drying process was carried out using a 60 kW dryer marketed by EnWave Corporation under the brand QuantaREV. The filled trays were fed automatically on a conveyor belt to the entrance vacuum lock of the dryer. The pressure of the vacuum chamber was 20 Torr. The filled trays travelled horizontally on a conveyor belt inside the chamber, passing through the six drying zones. The microwave power levels for the drying zones were set at alternating high, medium and low values, specifically, the power settings for the six drying sections, from the input end to the output end, were 10 kW, 4.4 kW, 7.4 kW, 1.6 kW, 5.0 kW and 1.6 kW, respectively. The total power applied was 30 kW and the total residence time (i.e., the drying time in the vacuum chamber) for each filled tray was about 70 minutes. About every 8 minutes one tray with fresh *cannabis* entered into the dryer at the input side and at the same time, one tray with dried *cannabis* exited from the output side. The hourly throughput of the process was around 37 kg of fresh *cannabis*. FIG. 2 shows the temperature of the *cannabis* in each of the six drying zones. The maximum surface temperature of the *cannabis* was approximately 39° C.

Total terpene measurements were done on the dried *cannabis* produced by this process, as well as on fresh *cannabis* material and on dried *cannabis* from a control example done by conventional rack drying. The rack drying was done for time periods in the range of 7-10 days, at temperatures in the range of 18-21° C., and at an ambient humidity in the range of 55-65%. The materials were cryogenically ground, extracted and subjected to gas chromatography and mass spectrometry. Triplicate measurements were done on each extracted sample. The total terpene retention was 88.862 wt. % for the *cannabis* dried by the continuous throughput microwave vacuum drying, whereas it was 74.313 wt. % for the *cannabis* dried by conventional rack drying.

The example described above was repeated using a different strain of *cannabis*, namely the "Think Fast" strain. Table 1 shows the total terpene concentration on a dry basis of both the LA Confidential strain and the Think Fast strain, in comparison with the respective rack drying control examples.

TABLE 1

| Strain | Terpene Concentration (wt. %) - Microwave Vacuum Drying | Terpene Concentration (wt. %) - Room Drying | % Greater Retention with Microwave Vacuum Drying |
|---|---|---|---|
| LA Confidential | 1.742 | 1.457 | 19.56 |
| Think Fast | 2.233 | 1.509 | 47.98 |

Compared to the room dried control *cannabis* flowers from the same harvest, the microwave vacuum dried LA Confidential strain flowers contained 19.56% more terpenes and the Think Fast strain *cannabis* flowers retained 47.98% more terpenes.

Example 2—Batch Drying

Trimmed fresh *cannabis* flowers of the "Kush Hemp" strain were dried using a 10 kW resonance cavity microwave vacuum dryer marketed by EnWave Corporation under the brand NUTRAREV. The *cannabis* was loaded in multilayer fashion in polyethylene drying trays, with a loading depth of approximately 2.0 inches. The total batch weight was 8.0 kg, comprising 1.0 kg on each of 8 trays.

The maximum surface temperature for the *cannabis* was set at 40° C. on the PLC screen. When the temperature sensor read a temperature value that was higher than 40° C. for a time of 2 seconds, the microwave power level was reduced automatically by the PLC to 50% of the set power level, and to stay at that reduced power level for 2 seconds before returning to the original level.

Figure 3:
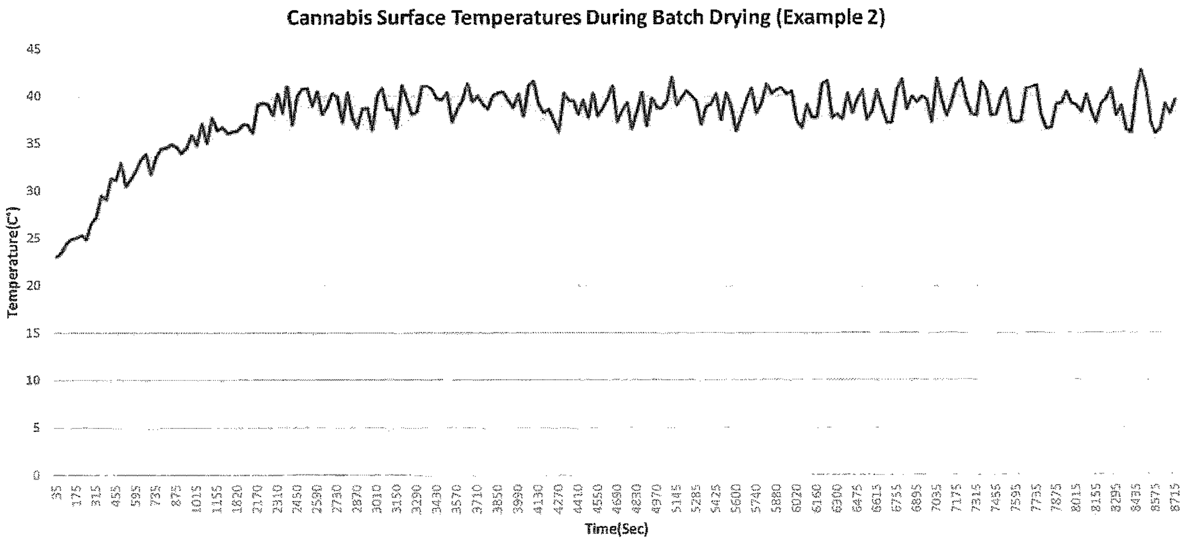
FIG. 3 is a graph showing the surface temperature of *cannabis* flowers during the batch drying process of Example 2.

The initial moisture content of the *cannabis* flowers was 81 wt. % and the target residual moisture content after drying was 16 wt. %. The target moisture loss was calculated at 6.19 kg. Based on an empirical drying rate of 1.05 kg/kWh, the total required microwave energy needed was 5.90 kWh. In this example, the total energy was allocated to three descending power levels, namely, 5000 W, 3500 W and 2000 W, for 1.965 kWh at each level. The total drying time was about 2.5 hours. The surface temperature profile of the *cannabis* during the drying process is shown in FIG. 3. The temperature of the *cannabis* increased gradually from around 20° C. and then remained steady at slightly over 40° C. during the 2.5 hour drying time.

Total terpene measurements were done as described for Example 1 on the dried *cannabis* produced by this batch process, as well as on fresh *cannabis* and on dried *cannabis* from a control example done by conventional rack drying. The terpene concentration was 2.51 wt. % for the *cannabis* dried was by the microwave vacuum process and 1.87 wt. % for the control example. Compared to the room-dried control *cannabis* flowers from the same harvest, the microwave vacuum-dried *cannabis* contained 34.58% more terpenes.

Throughout the foregoing description and the drawings, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the foregoing disclosure, many alterations and modifications are possible in the practice of this invention without departing from the scope thereof. Accordingly, the scope of the invention is to be construed in accordance with the following claims.

What is claimed is:

1. A method of drying *cannabis* in a vacuum chamber having a plurality of adjacent drying zones, the drying zones comprising a first drying zone, a last drying zone and one or more drying zones between the first drying zone and the last drying zone, the vacuum chamber being at a pressure less than atmospheric, comprising:

(a) loading the *cannabis* into the vacuum chamber;

(b) conveying the *cannabis* from an input end of the vacuum chamber to an output end through each of the drying zones between the input end and the output end while exposing the *cannabis* to microwave radiation;

(i) each of the drying zones having a microwave power level different from the microwave power level of an immediately adjacent drying zone, (ii) the microwave power level in each drying zone between the first drying zone and the last drying zone being either (i) lower than both immediately adjacent drying zones or (ii) higher than both immediately adjacent drying zones, whereby the *cannabis* is alternatively heated and cooled as it is conveyed through the vacuum chamber and a selected maximum surface temperature of the *cannabis* is maintained; and (c) unloading the dried *cannabis* from the vacuum chamber.

2. The method of claim 1, wherein the *cannabis* is conveyed through two or more drying zones between the first drying zone and the last drying zone.

3. The method of claim 1, wherein the *cannabis* is conveyed through three or more drying zones between the first drying zone and the last drying zone.

4. The method of claim 1, wherein the *cannabis* is conveyed through four or more drying zones between the first drying zone and the last drying zone.

5. The method of claim 1, wherein the conveying of the *cannabis* through the vacuum chamber is done at constant speed.

6. The method of claim 1, wherein the drying zones are of equal length.

7. The method of claim 1, wherein the selected maximum surface temperature of the *cannabis* in the vacuum chamber is 40° C. or less.

8. The method of claim 1, wherein the selected maximum surface temperature of the *cannabis* in the vacuum chamber is in the range of 30-45° C.

9. The method of claim 1, wherein the pressure is in the range of 10-50 Torr.

10. The method of claim 1, wherein the pressure is in the range of 20-30 Torr.

11. The method of claim 1, wherein the pressure is about 25 Torr.

12. The method of claim 1, wherein a residence time of the *cannabis* in the vacuum chamber is in the range of 80-150 minutes.

13. The method of claim 1, wherein a residence time of the *cannabis* in the vacuum chamber is in the range of 50-90 minutes.

14. The method of claim 1, wherein a residence time of the *cannabis* in the vacuum chamber is about 70 minutes.

15. The method of claim 1, wherein the *cannabis* is dried to a moisture content in the range of 1-16 wt. %.

16. The method of claim 1, wherein the *cannabis* to be dried contains terpenes and after drying the dried *cannabis* contains at least 75 wt. % of said terpenes.

17. The method of claim 1, wherein the *cannabis* to be dried contains terpenes and after drying the dried *cannabis* contains at least 80 wt. % of said terpenes.

18. The method of claim 1, wherein the *cannabis* to be dried contains terpenes and after drying the dried *cannabis* contains at least 89 wt. % of said terpenes.

19. The method according to claim 1, further comprising measuring the surface temperature of the *cannabis* in each of the drying zones during the conveying of the *cannabis* and controlling the microwave power level in each of the drying zones based on the measured surface temperatures.

20. A method of drying *cannabis* in a vacuum chamber having a plurality of adjacent drying zones, the drying zones comprising a first drying zone adjacent to an input end of the vacuum chamber, a last drying zone adjacent to an output end of the vacuum chamber, and one or more drying zones between the first drying zone and the last drying zone, comprising:

(a) activating microwave generators having a microwave power level in each of the drying zones such that the microwave power level in each drying zone between the first drying zone and the last drying zone is either (i) lower than both immediately adjacent drying zones or (ii) higher than both immediately adjacent drying zones;

(b) reducing the pressure in the vacuum chamber to a pressure below atmospheric;

(c) loading the *cannabis* into the vacuum chamber;

(d) conveying the *cannabis* from the input end to the output end through each of the drying zones while exposing the *cannabis* to microwave radiation at the power level of each respective drying zone and maintaining a selected maximum surface temperature of the *cannabis*; and (e) unloading the dried *cannabis* from the vacuum chamber.

21. An apparatus for dehydrating *cannabis*, comprising:

(a) a vacuum chamber having a plurality of adjacent drying zones, the drying zones comprising a first drying zone adjacent to an input end of the vacuum chamber, a last drying zone adjacent to an output end of the vacuum chamber, and one or more drying zones between the first drying zone and the last drying zone;

(b) means for loading the *cannabis* into the vacuum chamber at the input end;

(c) means for unloading the *cannabis* from the vacuum chamber at the output end;

(d) means for conveying the *cannabis* from the input end through the plurality of drying zones to the output end; and (e) microwave generators having a microwave power level in each of the drying zones such that the microwave power level of each drying zone between the first drying zone and the last drying zone is either (i) lower than in both immediately adjacent drying zones or (ii) higher than in both immediately adjacent drying zones.

22. The apparatus of claim 21, comprising two or more said drying zones between the first drying zone and the last drying zone.

* * * * *